Patented May 19, 1931

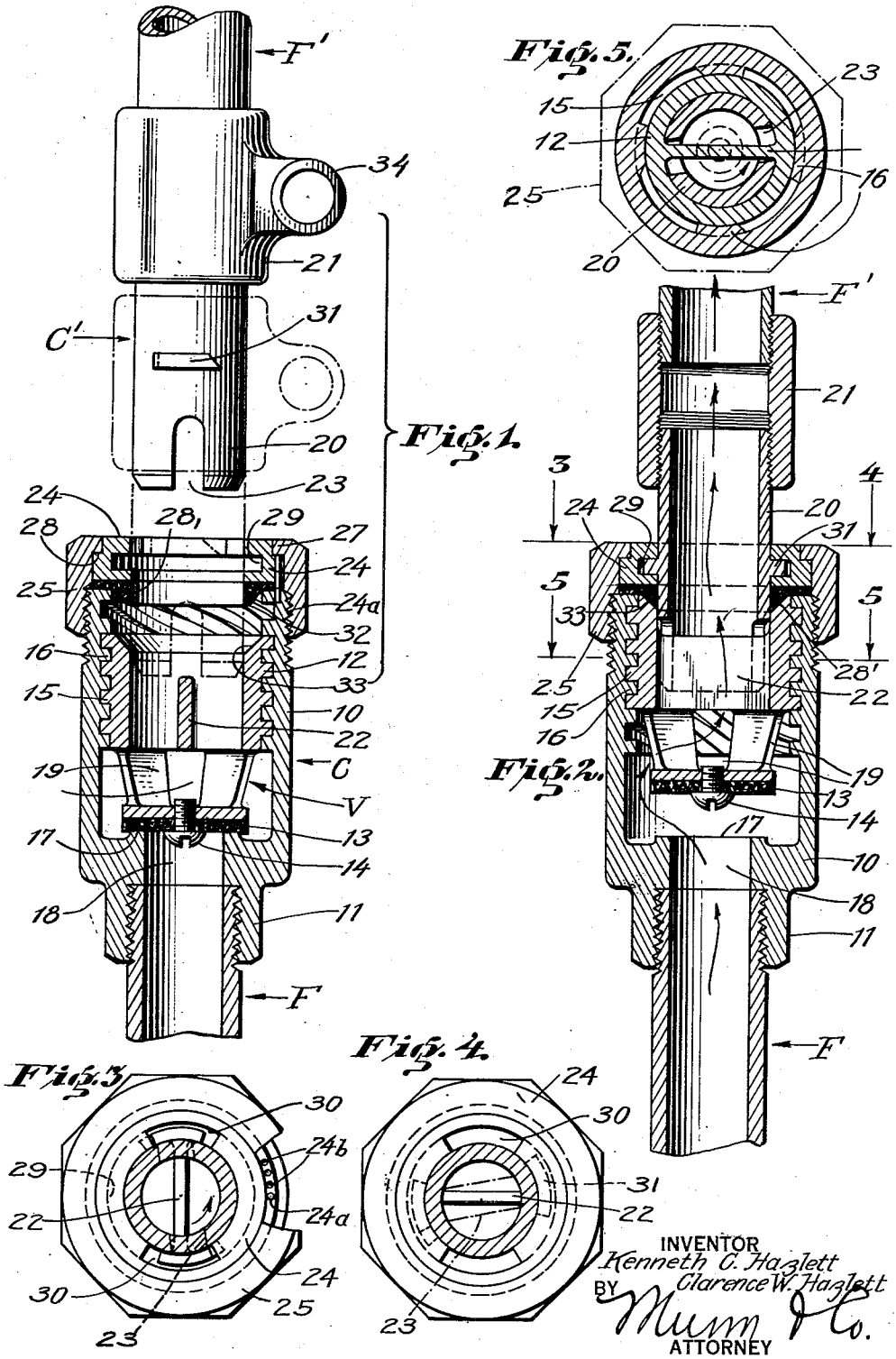

1,805,580

UNITED STATES PATENT OFFICE

KENNETH C. HAZLETT AND CLARENCE W. HAZLETT, OF SANTA MONICA, CALIFORNIA

COUPLING

Application filed August 25, 1928. Serial No. 302,062.

Our invention relates generally to couplings for detachably connecting fluid conduits, and it is a purpose of our invention to provide a quick detachable coupling by which fluid conduits can be securely connected in fluid communication with each other or disconnected with the utmost ease and dispatch and in a manner to insure a fluid-tight seal between the elements of the coupling when connected.

It is a further purpose of our invention to provide a coupling embodying a valve movable to open or closed position according as the coupling elements are connected or disconnected, all in such manner that the coupling elements can be disconnected only when the valve is closed, to the end that in the use of the coupling in connecting a fluid supply conduit and a fluid discharge conduit, the flow of fluid from the supply conduit will be positively cut off before the coupling elements can be disconnected and the flow permitted only when the elements are positively connected against separation.

It is another purpose of our invention to provide a coupling characterized by its structural simplicity, durability, and the accessibility of its parts for inspection, repair and replacement.

We will describe only one form of coupling embodying our invention and will then point out the novel features thereof in claims.

In the accompanying drawings

Fig. 1 is a longitudinal central sectional view of the elements comprising the coupling, with the elements disconnected and the valve embodied in the coupling, closed;

Fig. 2 is a view similar to Fig. 1 and illustrating the coupling elements connected and the valve open;

Figs. 3 and 4 are transverse sectional views taken on the line 3—4 of Fig. 2 and illustrating respectively, the relative positions occupied by the elements of the coupling when partially and fully connected; and Fig. 5 is a sectional view taken on the line 5—5 of Fig. 2.

Referring specifically to the drawings in which similar reference characters designate similar parts in each of the several views, our invention in its present embodiment broadly contemplates the provision of a pair of coupling elements designated generally at C and C' adapted to be secured respectively to fluid supply and discharge conduits F and F', the coupling element C preferably being provided with a valve designated generally at V, which is controlled by the coupling element C' in such manner as to be positively opened or closed by the latter according as the elements are connected or disconnected, to accordingly permit or prevent the flow of fluid from the supply conduit F, all in such manner that fluid can discharge from the supply conduit F only when the coupling elements are connected, and the flow of fluid positively cut off in response to disconnection of the elements.

The coupling element C constitutes a body member 10 preferably of hollow cylindrical form, open at one end and terminating at its other end in an internally threaded nipple 11 by means of which the body member is secured to the fluid supply conduit F. The valve V is constructed to provide a socket member 12 in the form of a sleeve open at one end and having its other end closed and provided with a disk of fibre, rubber or other suitable material 13, which is secured to the socket member 12 by a screw 14, the socket member being threaded externally as indicated at 15 for threaded engagement with threads 16 formed internally in the body member 10 so that according as the socket member is rotated in one direction or the other it will be moved longitudinally to engage the disk 13 with, or disengage the disk from, an annular valve seat 17 formed in the body member 10 and surrounding an outlet port 18. It thus may be said broadly that the valve V is mounted for movement in the body member 10 to open or close the port 18 according as the valve is rotated in one direction or the other. The side wall of the socket member 12 is provided adjacent the closed end of the latter with openings 19 through which fluid from the supply conduit F can flow into the socket member when the valve is in open position.

The coupling element C' constitutes an actuator for the valve V and is constructed to provide a tubular head member 20 adapted to co-operate with the socket member 12, and constituting a fluid conduit adapted to connect the discharge conduit F' with the supply conduit F. To one end of the head member is secured by a coupling sleeve 21, the discharge conduit F'. The head member is of such outside diameter as to be freely insertable into the socket member, and to operatively connect the head and socket members so that rotation of the former will correspondingly rotate the latter, the socket member is provided with a key 22 in the form of a web extending diametrically across the socket member, while the confronting end of the head member is provided with a diametrically extending slot 23 loosely receiving the key when the head member is fully inserted into the socket member so as to provide a splined connection between the two members.

It will thus be clear that according as the body member and head member 20 are relatively rotated in one direction or the other the valve V will be rotated to open or close the port 18, and to provide a quick detachable connection between the head and body members so that they will be positively connected against separation and can be disconnected only when the valve is closed, a coupling device is illustrated and in the present instance comprises a collar 24 clamped on the end of the body member 10 by a nut 25 threadedly engaging the body member as indicated at 26 and provided on one face with an inwardly projecting flange 27 seating against an annular shoulder 28 on the collar 24 so that the outer faces of the collar and nut will present a flush surface.

A gasket 28 in the form of a ring of yieldable material such as resilient rubber is interposed between the collar and outer end of the body member 10 and provides a fluid-tight joint between the two.

The collar 24 is positively fixed against rotation by means of a pin 24ª projecting from the outer end of the body member 10 and adapted to be received in any one of a plurality of circumferentially spaced openings 24ᵇ, in the collar so as to permit adjustment of the collar circumferentially and yet lock the collar in a selected position of adjustment. This adjustability of the collar is provided for a purpose to be hereinafter described. The collar is provided interiorly with an annular groove 29 and a pair of diametrically opposed recesses 30 communicating with the groove, while the head member 20 is provided with a pair of diametrically opposed lugs 31 capable of being extended through the recesses 30 and to traverse the groove 29 in response to rotary movement of the head member.

The position of the recesses 30 with respect to the key 22 of the valve V when the latter is in closed position, is such, that with the lugs 31 alined with the recesses 30, the slot 23 of the head member will be alined with the key to receive the latter so that the head member can be inserted into the socket member for rotation of the latter to open the valve.

A partial rotation of the head member is sufficient to move the valve from the closed position shown in Fig. 1 to the open position shown in Fig. 2, and in the open position of the valve it will be clear that due to the fact that the lugs 31 are disposed in the groove 29, disconnection of the head member from the socket member will be positively prevented and can only be effected upon reversely rotating the valve to closed position wherein the lugs will be again alined with the recesses 30 so that the head member can be withdrawn from the socket member. Thus it will be understood that broadly speaking the annular groove 29, recesses 30, and lugs 31 constitute a means by which the coupling elements C and C' are adapted to be connected or disconnected according as the elements are relatively rotated in one direction or the other, and co-operate with the operative connection between the head member 20 and socket member 12 to positively insure that upon connection of the coupling elements the valve V will be opened, while disconnection of the elements can be effected only when the valve is fully closed.

The pins 24ª of the body member 10 and the openings 24ᵇ in the collar 24, above referred to, permit the circumferential position of the collar to be varied to compensate for wear on the disk 13 of the valve or for disks of different thickness so that the relative circumferential positions of the key 22 with respect to the recesses 30 of the collar when the valve is closed, will be maintained constant as required to permit the entrance and withdrawal of the head member 20 to and from the socket member in the manner previously described.

It will be noted that the length of the head member 20 from its lugs 31 to its slotted end is such that the head member must be inserted into the socket member a sufficient distance to dispose the lugs 31 in the recesses 30 of the collar 24, before the slot 23 of the head member has operative engagement with the key 22 of the socket member so that premature rotation of the head member with a consequent opening of the valve V before the lugs 31 are in the plane of the annular groove 29 for traversal thereof by the lugs, will be prevented, and to further insure that opening of the valve will not be effected until the head member is connected to the socket member against separation therefrom, the key 22 loosely fits the slot 23 so that a limited rotational movement of the head member sufficient to at least partially dispose the lugs 31 in the annular groove 29, as shown in Fig. 3 must be effected before rotation of the head member is transmitted to the socket member.

To insure against fluid leakage between the head member 20 and collar 24 when the valve V is moved to the open position shown in Fig. 2, the gasket 28 is provided with an annular bead 32, while the inner wall of the socket member is beveled to provide an annular inclined surface 33 constituting a cam which engages the bead 32 and forces the latter radially inward into fluid sealing engagement with the head member.

The bead 32 and surface 33 thus broadly constitute a means which is operable to effect a fluid-tight seal between the head member and collar in response to movement of the valve V to open position, and due to the fact that the gasket 28 is clamped between the collar 24 and nut 25, any leakage of fluid between the two coupling elements C and C', when connected with the valve V fully open, is positively prevented.

In the operation of the coupling it will be clear that with the coupling elements C and C' connected and the valve V open, as shown in Fig. 2, fluid from the supply conduit F will be free to flow through the port 18, thence through the openings 19 into the socket member 12 and finally through the head member 20 into the discharge conduit F', all as clearly indicated by the arrows.

It will be noted that the coupling sleeve 21 is provided exteriorly with a transverse tubular projection 34 through which a suitable instrument such as a rod or bar (not shown) can be extended to provide leverage in the event it is desired to close the valve extremely tight or obtain the maximum fluid seal between the head member and collar when the valve is open, as would be necessary in the use of fluids at high pressures.

Although the coupling is capable of application to fluid conduits in general, and wherever it is desired to provide a quick detachable coupling embodying a control valve, it is particularly desirable in water sprinkling installations in lawns of large estates, golf courses, etc., in which instances the coupling element C would be mounted in the ground substantially flush with the surface of the latter, and would be secured to a suitable water supply conduit buried in the ground, while the coupling element C' would be secured to a conventional sprinkler head or length of hose. In the use of the coupling in industrial plants the coupling element C could be set in a wall or floor, and it will be clear that in all such installations, the parts of the coupling element C are readily accessible for repair or replacement by simply removing the nut 25.

Although we have herein shown and described only one form of coupling embodying our invention, it is to be understood that various changes and modifications may be made therein without departing from the spirit of the invention and the spirit and scope of the appended claims.

We claim:

1. A coupling of the character described comprising a body member adapted to be secured to a fluid supply conduit and having an outlet port, a valve controlling the port, means for mounting the valve for movement to open or close the port according as the valve is rotated in one direction or the other, an actuator for the valve adapted to be secured to a fluid discharge conduit, and insertable into the body member for operative engagement with the valve to open or close the latter according as the actuator is rotated in one direction or the other, means for detachably connecting the actuator to the body member, and means for producing a fluid-tight seal between the actuator and body member when the valve is open comprising a gasket of yieldable material surrounding the actuator when the latter is inserted into the body member, and means on the valve operable when the valve is moved to open position to force the gasket into fluid sealing engagement with the actuator.

2. A coupling of the character described comprising a body member adapted to be secured to a fluid supply conduit and having an outlet port, a valve controlling the port, means for mounting the valve for movement to open or close the port according as the valve is rotated in one direction or the other, an actuator for the valve adapted to be secured to a fluid discharge conduit, and insertable into the body member for operative engagement with the valve to open or close the latter according as the actuator is rotated in one direction or the other, means for detachably connecting the actuator to the body member, and means for producing a fluid-tight seal between the actuator and body member when the valve is open comprising a ring of yieldable material surrounding the actuator when the latter is inserted into the body member and having an annular bead, and an annular surface on the valve constituting a cam operating to force the bead into fluid sealing engagement with the actuator when the valve is moved to open position.

3. A coupling of the character described comprising a body member adapted to be secured to a fluid supply conduit and having an outlet port, a valve controlling the port, means for mounting the valve for rotary movement and movement axially to open or close the port according as the valve is rotated in one direction or the other, an actuator for the valve adapted to be secured to a fluid discharge conduit, and insertable into the body member for operative engagement with the valve to open or close the latter according as the actuator is rotated in one direction or the other, means for detachably connecting the actuator to the body member comprising a stationary collar on the body through which the actuator is adapted to be extended for operative engagement with the valve, co-acting coupling means on the collar and actuator, and a gasket clamped between the body and collar, through which the actuator is insertable, for co-action of the gasket with the valve when open, in sealing the actuator against the escape of fluid therearound.

4. A coupling of the character described comprising a body member having a port, a socket member threaded in the body member and having a valve for opening or closing the port according as the socket member is rotated in one direction or the other, a tubular head member constituting a fluid conduit insertable into the socket member, co-acting means on the head and socket members by which the two are adapted to be operatively connected for rotation of the socket member by the head member, and means by which withdrawal of the head member from the socket member can be effected only when the valve is in closed position comprising a stationary collar on the body member through which the head member is adapted to be extended, having an annular groove interiorly thereof and a recess communicating with the groove, and a lug on the head member extendible through said recess and adapted to traverse the groove, said co-acting means on the head and socket members providing for a limited rotation of the head member independent of the socket member so that the lug of the head member can at least partially enter the annular groove of the socket member before rotation of the latter by the head member is initiated, for the purpose described.

5. A coupling of the character described comprising a body member having a port, a socket member threaded in the body member and having a valve for opening or closing the port according as the socket member is rotated in one direction or the other, a tubular head member constituting a fluid conduit insertable into the socket member, co-acting means on the head and socket members by which the two are adapted to be operatively connected for rotation of the socket member by the head member, and means by which withdrawal of the head member from the socket member can be effected only when the valve is in closed position comprising a stationary collar on the body member through which the head member is adapted to be extended, having an annular groove interiorly thereof and a recess communicating with the groove, and a lug on the head member extendible through said recess and adapted to traverse the groove, said co-acting means on the head and socket members being ineffective to operatively connect the members until the head member has been inserted into the socket member sufficiently to at least position the head member in the recess of the collar so that rotation of the socket member by the head member to prematurely open the valve will be prevented.

6. A coupling of the character described comprising a body member having a port, a socket member threaded in the body member and having a valve for opening or closing the port according as the socket member is rotated in one direction or the other, a tubular head member constituting a fluid conduit insertable into the socket member, co-acting means on the head and socket members by which the two are adapted to be operatively connected for rotation of the socket member by the head member, and means by which withdrawal of the head member from the socket member can be effected only when the valve is in closed position comprising a stationary collar on the body member through which the head member is adapted to be extended, having an annular groove interiorly thereof and a recess communicating with the groove, and a lug on the head member extendible through said recess and adapted to traverse the groove, a gasket interposed between the collar and body member, and means on the socket member by which the gasket is caused to be forced into fluid sealing engagement with the head member when the socket member is moved to the position in which the valve is open to prevent fluid leakage between the head member and collar.

7. A coupling of the character described comprising a body member adapted to be secured to a fluid supply conduit and having an outlet port, a valve controlling the port, means for mounting the valve for movement to open or close the port according as the valve is rotated in one direction or the other, an actuator for the valve adapted to be secured to a fluid discharge conduit, and insertable into the body member for operative engagement with the valve to open or close the latter according as the actuator is rotated in one direction or the other, and means for detachably connecting the actuator to the body member, said co-acting means on the head and socket members comprising a key in the socket member and a slot in the actuator slidably receiving the key to provide a splined connection between the socket member and actuator, the key loosely fitting the slot to permit limited rotation of the head member independent of the socket member for the purpose described.

8. A coupling of the character described comprising a body member adapted to be secured to a fluid supply conduit and having an outlet port, a valve controlling the port, means for mounting the valve for rotary movement and movement axially to open or close the port according as the valve is rotated in one direction or the other, an actuator for the valve adapted to be secured to a fluid discharge conduit, and insertable into the body member for operative engagement with the valve to open or close the latter according as the actuator is rotated in one direction or the other, and means for detachably connecting the actuator to the body member comprising a stationary collar on the body through which the actuator is adapted to be extended for operative engagement with the valve, co-acting coupling means on the collar and actuator, and means by which the collar can be adjusted circumferentially relative to the body member and locked in a selected position of adjustment.

Signed at Los Angeles, in the county of Los Angeles, and State of California this 10th day of August, A. D. 1928.

KENNETH C. HAZLETT.
CLARENCE W. HAZLETT.